United States Patent
Kitazaki et al.

(10) Patent No.: US 7,370,523 B2
(45) Date of Patent: May 13, 2008

(54) TIRE DEFORMATION CALCULATING METHOD AND TIRE DEFORMATION CALCULATING APPARATUS

(75) Inventors: Tsuyoshi Kitazaki, Kanagawa (JP); Naoshi Miyashita, Kanagawa (JP); Noritaka Koguchi, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 71 days.

(21) Appl. No.: 10/594,207

(22) PCT Filed: Nov. 21, 2005

(86) PCT No.: PCT/JP2005/021369

§ 371 (c)(1),
(2), (4) Date: Sep. 21, 2006

(87) PCT Pub. No.: WO2006/054745

PCT Pub. Date: May 26, 2006

(65) Prior Publication Data

US 2007/0213953 A1    Sep. 13, 2007

(30) Foreign Application Priority Data

Nov. 19, 2004 (JP) .............................. 2004-335417

(51) Int. Cl.
*G01M 17/02* (2006.01)
(52) U.S. Cl. ..................... 73/146; 73/146.2; 340/444; 340/438
(58) Field of Classification Search ................. 73/146, 73/146.2; 340/444, 447, 438
See application file for complete search history.

(56) References Cited

U.S. PATENT DOCUMENTS

| | | | | |
|---|---|---|---|---|
| 5,471,390 A | * | 11/1995 | Sasaki | .......................... 701/78 |
| 5,525,549 A | | 6/1996 | Fukada et al. | |
| 5,717,376 A | * | 2/1998 | Wilson | ....................... 340/442 |
| 5,825,286 A | * | 10/1998 | Coulthard | .................... 340/447 |

(Continued)

FOREIGN PATENT DOCUMENTS

JP          05-080069          3/1993

(Continued)

OTHER PUBLICATIONS

Notification of Reasons for Refusal by Japanese Intellectual Property Office on Aug. 29, 2006, abstract only.

*Primary Examiner*—Andre J. Allen
(74) *Attorney, Agent, or Firm*—Knobbe Martens Olson & Bear LLP (57) ABSTRACT

A deformation of a rotating tire on a road surface is calculated the following. At first, time series data of acceleration extracted from measurement data of acceleration corresponding to one round of tire rotation is subjected to a time integration of second order to obtain displacement data so as to calculate the deformation at the tread portion. The time series data of acceleration and the displacement data in the non-contact region excluding a road surface contact region on the tire circumference at the tread portion are respectively approximated to calculate a first and a second approximation curves. The two approximation curves are subtracted respectively from the time series data of acceleration and the calculated displacement data, thereby extracting time series data of acceleration due to tire deformation and obtaining the deformation at the tread portion.

16 Claims, 8 Drawing Sheets

U.S. PATENT DOCUMENTS

| | | | |
|---|---|---|---|
| 5,866,812 A * | 2/1999 | Nishihara et al. | 73/146.2 |
| 5,900,808 A * | 5/1999 | Lebo | 340/442 |
| 6,275,148 B1 | 8/2001 | Takamura et al. | |
| 6,538,566 B1 | 3/2003 | Morand et al. | |
| 7,069,135 B2 | 6/2006 | Bertrand | |
| 2004/0219550 A1 | 11/2004 | Babio et al. | |
| 2005/0085987 A1 | 4/2005 | Yokoda et al. | |

FOREIGN PATENT DOCUMENTS

| | | |
|---|---|---|
| JP | 6-5583 | 1/1994 |
| JP | 08-297033 | 11/1996 |
| JP | 10-063288 | 3/1998 |
| JP | 2000-238515 A | 9/2000 |
| JP | 2000-292330 | 10/2000 |
| JP | 2002-90264 A | 3/2002 |
| JP | 2002-511812 A | 4/2002 |
| JP | 2002-317679 | 10/2002 |
| JP | 2002-340863 | 11/2002 |
| JP | 2003-182476 | 7/2003 |
| JP | 2004-163140 | 6/2004 |
| JP | 2004-340616 | 12/2004 |
| WO | WO 03/001176 A2 | 1/2003 |
| WO | WO 03/066400 A1 | 8/2003 |
| WO | WO 03/082643 A1 | 10/2003 |

* cited by examiner

TIRE DEFORMATION CALCULATING METHOD AND TIRE DEFORMATION CALCULATING APPARATUS

TECHNICAL FIELD

The present invention relates to a tire deformation calculating method and a tire deformation calculating apparatus that calculate a deformation on a tire circumference at a predetermined portion of a tire which is rotating on a road surface by using measurement data of acceleration acquired by an acceleration sensor or other suitable devices provided on the predetermined portion of the tire. In particular, the present invention relates to a tire deformation calculating method and a tire deformation calculating apparatus that calculate a deformation on a tire circumference at a tread portion of a tire which is rotating on a road surface by using measurement data of acceleration acquired by an acceleration sensor or other suitable devices provided on the tread portion of the tire.

BACKGROUND ART

Conventionally, finite element models have been used to simulate a rotating tire, in order to acquire a contact length or distribution of deformation (deformation shape) on a tire circumference at a tread portion of the tire. In such acquiring methods, however, because of the time required for preparing finite element models as well as required for simulation computing, it has been difficult to obtain the deformation shape of the tread portion or the contact length in a short period of time. For this reason, the contact length and the deformation shape of a stationary tire has been used as substitutes for those of a rotating tire.

However, in consideration that the deformation shape on the tire circumference affects the contact length and the contact region contour, and therefore has a significant effect on the tire performance, there has been a need for acquiring the contact length and the deformation shape that are measured with the rotating tire in order to determine the tire performance accurately.

The following Patent Documents 1 to 3 disclose, for instance, a method in which an acceleration sensor is attached to a tire to acquire measurement data of acceleration of the tire during rotation, and from the acquired measurement data, power spectrums and vibration spectrums are obtained to estimate the status of the road during the tire rotation, and a method in which a timing at which a tread portion is in contact with a road surface is determined from measurement data of acceleration in a radial direction.

However, any one of the Patent Documents 1 to 3 does not allow the deformation shape and the contact length of a rotating tire to be calculated from the measurement data of acceleration, though it is possible to estimate the status of the road surface using the measurement data.

Patent Document 1: JP 2002-340863 A
Patent Document 2: JP 2003-182476 A
Patent Document 3: JP 2002-511812 A

DISCLOSURE OF THE INVENTION

Problems to be Solved by the Invention

In view of the above problems, the present invention has an object to provide a tire deformation calculating method and a tire deformation calculating apparatus that calculate a deformation of a tire which is rotating on a road surface by using measurement data of acceleration at a predetermined position on the tire, and in particular, to provide a tire deformation calculating method and a tire deformation calculating apparatus that calculate a deformation of a tire which is rotating on a road surface by using measurement data of acceleration at a tread portion of the tire.

Means to Solve the Problems

To solve the above problems, the present invention provides a tire deformation calculating method for calculating a deformation of a tire which is rotating on a road surface, the method comprising: an acquiring step for acquiring measurement data of acceleration at a predetermined portion of the rotating tire for a duration corresponding to at least one round of tire rotation; a signal processing step for extracting, from the acquired measurement data of acceleration, time series data of acceleration due to tire deformation; and a deformation calculating step for subjecting the time series data of acceleration due to tire deformation to a time integration of second order to obtain displacement data so as to calculate the deformation at the predetermined portion of the tire.

Then, in the acquiring step, for example, the acceleration at a tread portion of the tire is acquired, and in the deformation calculating step, the deformation at the tread portion of the tire is calculated. Then, a region on the tire circumference at the tire tread portion is divided into a first region including a contact region in contact with the road surface, and a second region including other than the first region; in the signal processing step the measurement data of acceleration in the second region is approximated to calculate a first approximation curve defined on the first and second regions, and subtracts the first approximation curve from a waveform of the acceleration acquired in the acquiring step to extract time series data of acceleration due to tire deformation in the first and second regions. On the other hand, a region on the tire circumference at the tire tread portion is divided into a third region including a contact region in contact with the road surface, and a fourth region including other than the third region; and the deformation calculating step approximates the displacement data in the fourth region to calculate a second approximation curve defined on the third and fourth regions, and subtracts the second approximation curve from a waveform of the displacement data so as to calculate the deformation of the tire.

Moreover, by subjecting the obtained data of the deformation of the tire to a differentiation of second order with respect to time, time series data of acceleration corresponding to deformation of the tire, that is, more accurate and noise-free time series data of acceleration due to tire deformation can be obtained.

The first approximation curve is preferably obtained by providing a plurality of nodes in the second region, and by approximating the measurement data of acceleration in the first region in addition to the second region.

More preferably, the first approximation curve is calculated by applying weighting coefficients to the time series data of acceleration in the first region and to the time series data of acceleration in the second region; and a greater weighting coefficient is applied to the time series data of acceleration in the second region than a weighting coefficient applied to the time series data of acceleration in the first region to approximate the time series data of acceleration in the first and second regions.

Preferably, the second region has an angle in a circumferential direction of at least 60 degree in an absolute value, the angle defined relative to a center position of the contact region of the tire.

Preferably, the second approximation curve is obtained by providing a plurality of nodes in the fourth region, and by approximating the displacement data in the third region in addition to the fourth region.

More preferably, the second approximation curve is calculated using a least squares method by applying weighting coefficients to the displacement data in the third region and to the displacement data in the fourth region, and a greater weighting coefficient is applied to the displacement data in the fourth region than a weighting coefficient applied to the displacement data in the third region to approximate the displacement data in the third and fourth regions.

The measurement data of acceleration is acquired, for example, by an acceleration sensor that is arranged in the tire tread portion.

The measurement data of acceleration is preferably at least one of acceleration data in a radial direction perpendicular to a circumferential direction of the tire, acceleration data in the circumferential direction of the tire, and acceleration data in a width direction of the tire.

Preferably, the measurement data of acceleration includes the acceleration data in a radial direction perpendicular to a circumferential direction of the tire, or includes, in addition to the acceleration data in the radial direction, the acceleration data in the circumferential direction of the tire; the deformation of the tire is the deformation at the tread portion of the tire in the radial and circumferential directions, or the deformation in the radial direction; and from the deformation, the contact length of the tire during rotation is calculated.

In the tire deformation calculating method, if the measurement data of acceleration is the acceleration data in the radial direction perpendicular to the circumferential direction of the tire, the contact length is preferably calculated by determining two positions at which the time series data of acceleration due to tire deformation crosses an acceleration of 0, and by using the two positions as positions corresponding to a leading edge and a trailing edge of the contact region of the tire. Specifically, the time series data of acceleration due to tire deformation to be used for calculating the contact length is preferably obtained by subjecting the deformation calculated in the deformation calculating step to a differentiation of second order with respect to time.

Alternatively, the contact length is preferably calculated by obtaining a deformation shape of the tire from the displacement data obtained in the deformation calculating step and by assuming positions at which the deformation shape crosses a line which is a certain distance away from a lowest point of the tire toward upward direction of the tire as a leading edge and a trailing edge of the contact region of the tire.

The invention also provides a tire deformation calculating apparatus for calculating a deformation of a tire which is rotating on a road surface, the apparatus comprising: an acquiring unit for acquiring measurement data of acceleration at a predetermined portion of the rotating tire for a duration corresponding to at least one round of tire rotation; a signal processing unit for extracting, from the acquired measurement data of acceleration, time series data of acceleration due to tire deformation; and a deformation calculating unit for subjecting the time series data of acceleration due to tire deformation to a time integration of second order to obtain displacement data so as to calculate the deformation at the predetermined portion of the tire.

EFFECTS OF THE INVENTION

The present invention enables calculation of a deformation of a tire that is rotating on a road surface by using measurement data of acceleration obtained at a predetermined portion, for example, at a tread portion. Particularly, if the predetermined portion of the tire is the tread portion, a region on a tire circumference at the tire tread portion is divided into a first region including a contact region in contact with the road surface, and a second region including other than the first region, and by approximating the measurement data of acceleration in the second region, a first approximation curve defined in the first and second regions is calculated. Accordingly, background components including acceleration components of the centrifugal force (centripetal force) due to rotation of the tire and acceleration components of the gravitational force can be effectively obtained. In particular, since the first approximation curve is calculated through approximation of the time series data of acceleration in the first and second regions by providing a plurality of nodes in the second region and since the first approximation curve is calculated by applying a greater weighting coefficient to the time series of acceleration in the second region than a weighting coefficient applied to the time series data in the first region, the background components can be obtained with higher accuracy.

In addition, a region on a tire circumference at the tire tread portion is divided into a third region including a contact region in contact with the road surface, and a fourth region including other than the third region and by approximating displacement data in the fourth region, a second approximation curve defined in the third and fourth regions is calculated. The background components can thereby be obtained in such a manner that the deformation of the tire cyclically changes with the rotation of the tire. In particular since the second approximation curve is calculated through approximation of the displacement data in the third and fourth regions by providing a plurality of nodes in the fourth region, and since the second approximation curve is calculated by applying a greater weighting coefficient to the displacement data in the fourth region than a weighting coefficient applied to the displacement data in the third region, the background components can be obtained with higher accuracy.

LEGEND 1 tire
2 acceleration sensor
3 receiver
4 amplifier
10 tire deformation calculating apparatus
12 data acquiring unit
14 signal processing unit
16 deformation calculating unit
18 data output unit
20 memory
22 CPU
24 display

BEST MODE FOR CARRYING OUT THE INVENTION

Hereinafter, the tire deformation calculating method and the tire deformation calculating apparatus according to the present invention will be described in detail with reference to the preferred embodiments shown in the attached drawings.

Figure 1:
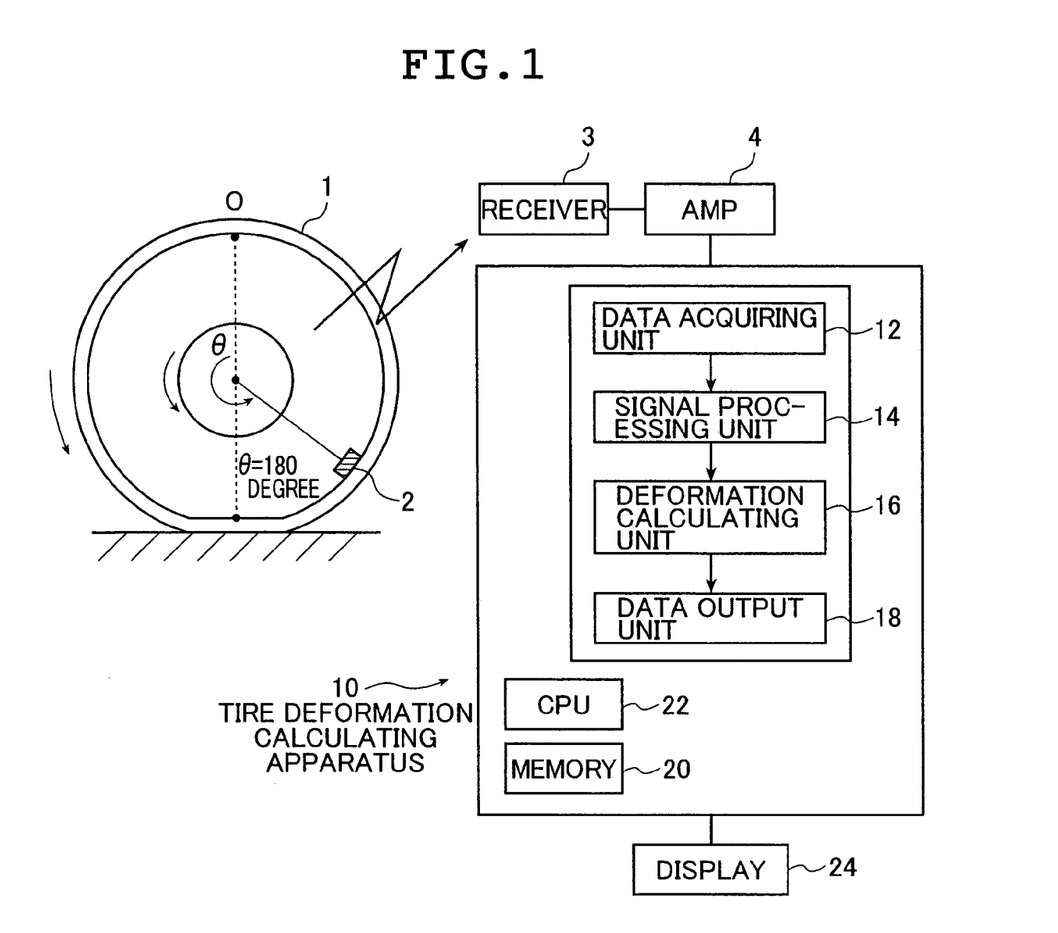
FIG. 1 is a block diagram showing an example of a tire deformation calculating apparatus implementing a tire deformation calculating method of the present invention.

FIG. 1 is a block diagram showing a structure of an embodiment of the tire deformation calculating apparatus according to the present invention that implements the tire deformation calculating method according to the present invention.

The embodiment described below uses the measurement data of acceleration which is measured on an inner circumference surface at a tread portion of a tire. However, in the practice of the present invention, the measurement data of acceleration to be used is not limited to that obtained at the tread portion. The measurement data of acceleration may be those obtained inside the tread portion, at the belt portion, at the side portion or the like.

A tire deformation calculating apparatus 10 shown in FIG. 1 is employed as an apparatus for calculating a deformation of a tire 1 by using measurement data of acceleration obtained at a tread portion of the tire 1. The acceleration at the tread portion of the tire 1 is the measurement data of acceleration that has been detected by an acceleration sensor 2 fixed on an inner circumference surface in a tire cavity region inside the tire and amplified by an amplifier 4. The measurement data acquired by the acceleration sensor 2 is the data that has been transmitted by a transmitter (not-shown) provided on the rotating tire to a receiver 3 and amplified by the amplifier 4. For example, a transmitter may be provided on a wheel assembled to the tire to transmit the measurement data from the acceleration sensor 2 to the receiver 3, or a transmitting function may be added to the acceleration sensor 2 so that the data is transmitted from the acceleration sensor 2 to the receiver 3. Alternatively, an amplifier and a transmitter may be both provided on the wheel and the data received by the receiver is supplied to the tire deformation calculating apparatus 10.

The acceleration sensor 2 is exemplified by a semiconductor acceleration sensor, for example, disclosed in Japanese Patent Application No. 2003-134727 (JP 2004-340616 A) filed by the present applicant. The semiconductor acceleration sensor includes, specifically, an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

By fixing the acceleration sensor to the tire inner circumference surface, the acceleration applied to the tread portion during tire rotation can be measured.

Other sensors that may be used as the acceleration sensor 2 include known acceleration pickups that use piezoelectric elements, and known distortion gage type acceleration pickups that incorporate distortion gages.

The measurement data acquired by the acceleration sensor may be transmitted by a transmitter provided on the acceleration sensor.

The tire deformation calculating apparatus 10, to which the measurement data of acceleration amplified by the amplifier 4 is supplied, has a data acquiring unit 12, a signal processing unit 14, a deformation calculating unit 16, and a data output unit 18. These units are configured by subroutines and subprograms executable on a computer. In other words, the above individual units are operated by execution of software on a computer that has a CPU 22 and a memory 20, thus forming the tire deformation calculating apparatus 10.

Alternatively, instead of using a computer, the tire deformation calculating apparatus of the present invention may be configured as a dedicated apparatus in which functions of individual units are configured by a dedicated circuit.

The data acquiring unit 12 is employed as a unit for acquiring, as input data, measurement data of acceleration for a duration corresponding to at least one tire circumference, amplified by the amplifier 4. The data supplied from the amplifier 4 is in a form of analog data which is then converted to digital data by sampling with a predetermined sampling frequency.

The signal processing unit 14 is employed as a unit for extracting time series data of acceleration based on the tire deformation from the digitized measurement data of acceleration. The signal processing unit 14 carries out smoothing processing on the measurement data of acceleration and calculates an approximation curve to the smoothed signals so as to obtain a background component 1. The background component 1 is removed from the measurement data of acceleration that has been subjected to smooth processing, so that the time series data of acceleration based on the tire deformation is obtained. Specific processing will be described later.

The deformation calculating unit 16 is employed as a unit for calculating deformation of the tire by subjecting the time series data of acceleration based on the tire deformation to time integration of second order to determine displacement data. The time series data of acceleration based on the tire deformation is subjected to integration of second order with respect to time. Then an approximation curve on the data obtained through integration of second order is calculated to determine a background component 2. The obtained background component 2 is removed from the displacement data obtained through integration of second order, so that the deformation of the tire is calculated. Further, the calculated data of deformation of the tire is then subjected to differentiation of second order with respect to time, so that data of acceleration corresponding to the tire deformation, that is, time series data of acceleration based on the tire deformation that does not include noise components is calculated. Specific processing will be described later.

The data output unit 18 is employed as a unit for obtaining, as output data, a contact length and a deformation shape of the tire at the tread portion from the calculated tire deformation and the time series data of acceleration due to tire deformation. The obtained output data is sent to the display 24 and used in, such as, displaying a graph.

Figure 2:
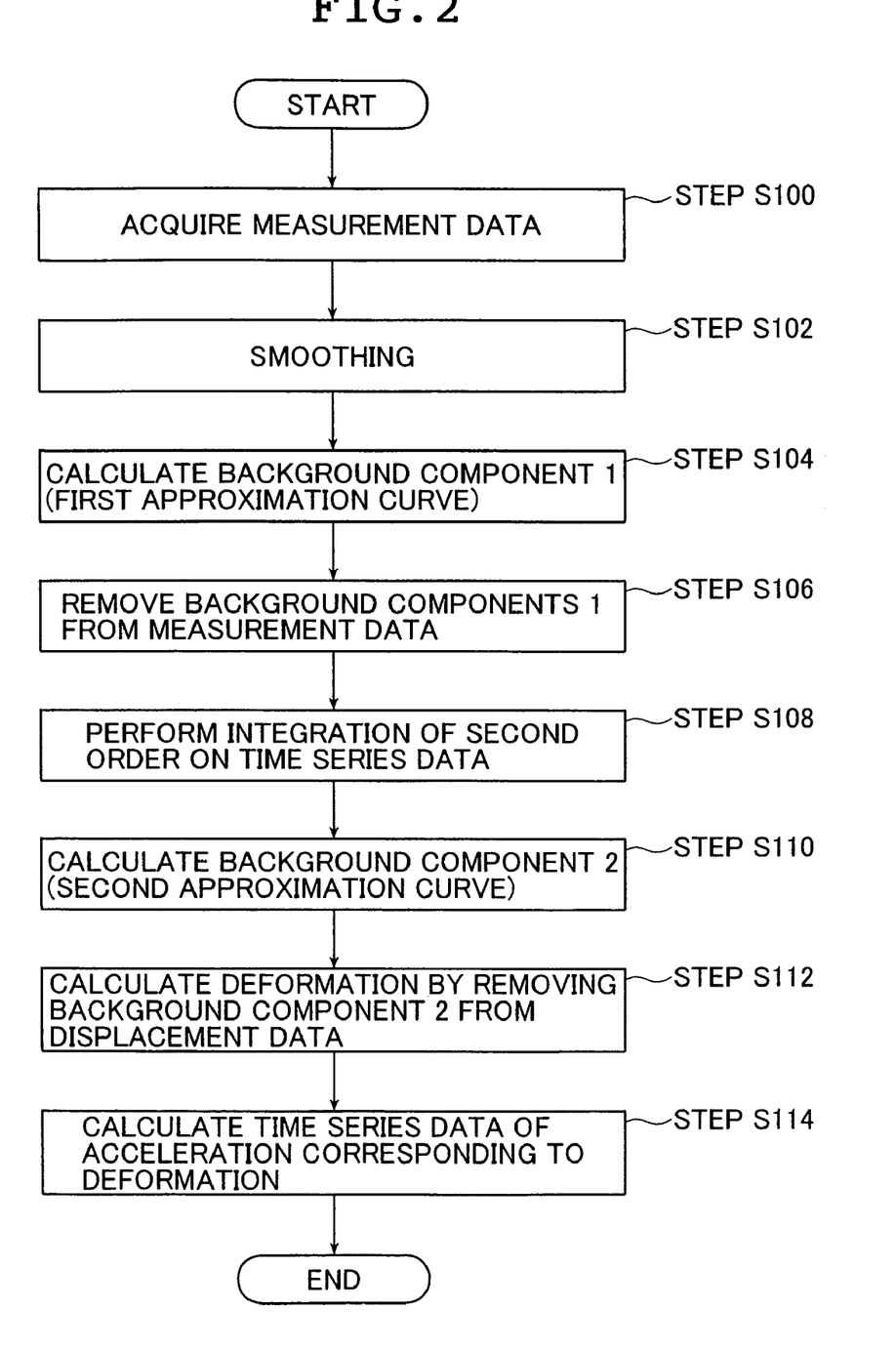
FIG. 2 is a flow chart showing the steps of the tire deformation calculating method according to the present invention.

FIG. 2 is a flow chart showing the steps of the tire deformation calculating method that are carried out in the tire deformation calculating apparatus 10 described above. FIGS. 3A to 3D and FIGS. 4A to 4C are graphs each showing an example of results obtained in the steps of the tire deformation calculating method. In the graphs, any of the results shown are those obtained by calculating the deformation in the radial direction at the tread portion of the tire from the measurement data of acceleration in the radial direction of the tire, among several kinds of measurement data obtainable by the acceleration sensor 2.

It should be noted that the present invention is not limited to the case in which deformation in the radial direction is calculated using the measurement data of acceleration in the radial direction of the tire. It is possible to obtain the deformation in the circumferential direction or in the width direction from the measurement data of acceleration in the circumferential direction or in the width direction of the tire. Further it is also possible to acquire two kinds of measurement data of acceleration both in the circumferential direction and in the width direction at the same time to calculate the deformation both in the circumferential direction and in the width direction at the same time.

First, acceleration amplified by the amplifier 4 is supplied to the data acquiring unit 12 and is sampled with a predetermined sampling frequency to obtain digitized measurement data (step S100).

Figure 3A:
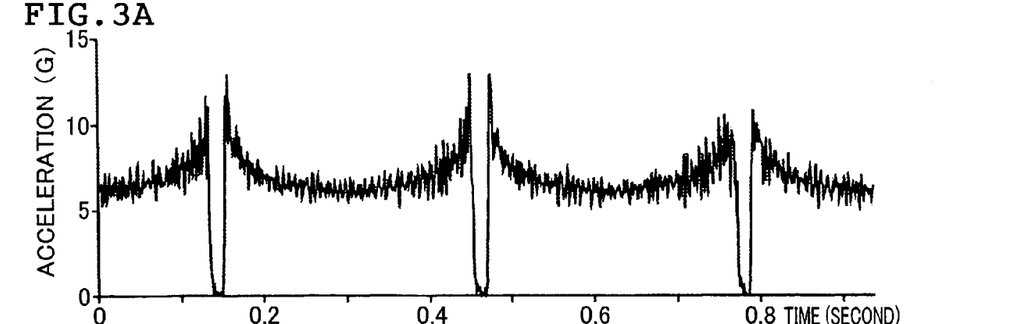
FIGS. 3A to 3D are graphs each showing a signal waveform obtained by the tire deformation calculating method according to the present invention.
Figure 3B:
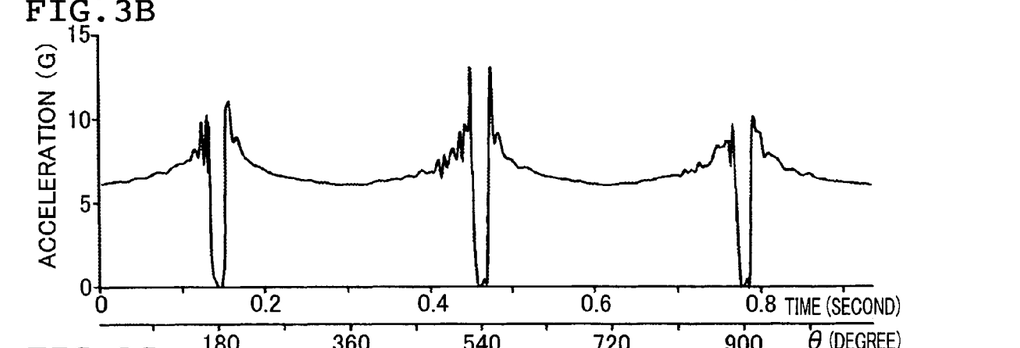

Next, the acquired measurement data is then supplied to the signal processing unit 14 and is subjected to smoothing process with a filter (step S102). The measurement data supplied to the signal processing unit 14, as it contains many noise components as shown in FIG. 3 A, is then subjected to smoothing processing to provide smoothed data as shown in FIG. 3 B. The filters that may be used include, for example, digital filters that assume a certain frequency as a cut-off frequency. The cut-off frequency changes depending on rotation speeds or noise components. For example, if the rotation speed is 60 (Km/h), the cut-off frequency is between 0.5 and 2 (kHz). Alternatively, instead of using the digital filters, moving average process, trend model process, and other suitable processes may be used as the smoothing processing.

In the time series graphs shown in FIG. 3 B, the time axis is given in the horizontal axis and a position on the tire circumference is represented in $\theta$ (degree) in the horizontal axis. The position of $\theta$ (degree) on the tire circumference represents angle given relative to a point 0 (see FIG. 1) that is located opposite to the center position ($\theta$=180 degree) of the contact patch of the tire. The position of $\theta$ (degree) on the tire circumference is obtainable by detecting a mark provided on the tire with mark detecting means (not shown) and assuming the relative positional relation between the circumferential position of the mark and the circumferential position of the acceleration sensor 2, allowing determination of the position of $\theta$ (degree) on the circumference of the rotating tire. Alternatively, the position of $\theta$ (degree) on the circumference of the rotating tire may be determined relative to the position of minimum values in the time series graph, which is assumed to be the center position ($\theta$=180 degree) of the contact patch.

In FIG. 3B, the center position of the contact patch corresponds to positions of $\theta$=180 degree, 540 degree, and 900 degree. The FIG. 3B shows the measurement data of acceleration for a duration corresponding to approximately three rounds of tire rotation.

Then, the background component 1 is calculated from the smoothed measurement data of acceleration (step S104).

Figure 3C:
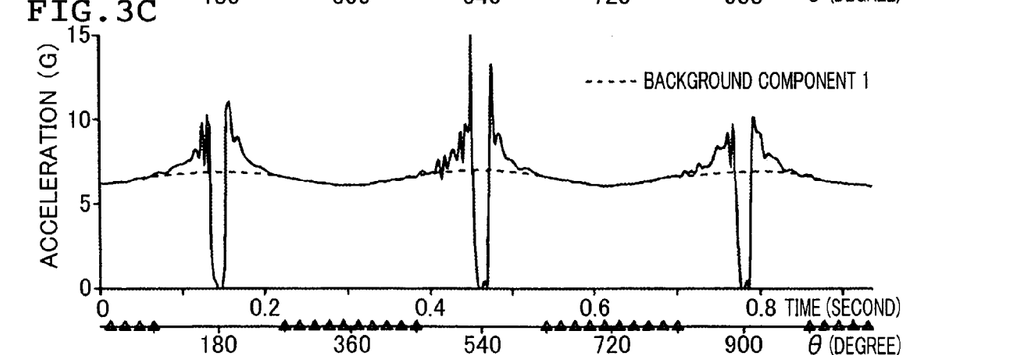

The background component 1 of the acceleration in the radial direction includes acceleration components of the centrifugal force (centripetal force) due to rotation of the tire and acceleration components of the gravitational force (note that these components are also included in the background component of the acceleration in the circumferential direction). In FIG. 3C, the waveform of the background component 1 is indicated with dotted lines. The background component 1 is obtained so as to approximate the measurement data of acceleration in the region (second region) on the circumference, that is defined by excluding angle ranges of equal to or greater than 0 degree and less than 90 degree in absolute values relative to the center position of the contact patch having a $\theta$ of 180 degree, 540 degree, and 900 degree.

More specifically, the region of the tire circumference is divided into a first region including a contact region in contact with a road surface and a second region including other than the first region. The regions that are defined as the first region include a region having a $\theta$ of greater than 90 degreeand less than 270 degree, a region having a $\theta$ of greater than 450 degree and less than 630 degree, and a region having a $\theta$ of greater than 810 degree and less than 990 degree. On the other hand, the regions that are defined as the second region include a region having a $\theta$ of equal to or greater than $\theta$ degree and equal to or less than 90 degreeand equal to or greater than 270 degreeand equal to or less than 360 degree; a region having a $\theta$ of equal to or greater than 360 degree and equal to or less than 450 degree and equal to or greater than 630 degree and equal to or less than 720 degree; and a region having a $\theta$ of equal to or greater than 720 degree and equal to or less than 810 degree and equal to or greater than 990 degree and equal to or less than 1080 degree. The background component 1 is obtained by calculating a first approximation curve on the data in the first and the second regions by means of least squires method using a plurality of positions ($\theta$, or time corresponding to $\theta$) on the circumference in the second region as the nodes and using a predetermined function groups for example spline functions of third order. The nodes provide constraint conditions on the horizontal axis, that give local curvatures (jog) of the spline functions. In the example shown in FIG. 3B, the positions as indicated by "Δ" in FIG. 3B, that is, the positions of time where $\theta$ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1010 degree, 1030 degree, 1050 degree, and 1070 degree are defined as the node positions.

By carrying out function approximation on the data n in FIG. 3B with the spline functions of third-order having the above nodes, the approximation curve as indicated by dotted lines in FIG. 3C is calculated. In the function approximation, there are no nodes in the first regions, and only the plurality of nodes in the second regions are used, and in least squares method that is carried out in conjunction with the function approximation, weighting coefficients are used. In calculation, the weighting coefficients are set in such a manner that if the weighting coefficient for the second regions is set to 1, the weighting coefficient for the first regions is set to 0.01. The reason why the weighting coefficient for the first regions is smaller than the weighting coefficient for the second regions, and no nodes are set in the first regions in calculating the background component 1, as described above, is to calculate the first approximation curve from the measurement data of acceleration mainly in the second regions. In the second regions, the acceleration components of the rotating tire is dominated by the acceleration components of the centrifugal force (centripetal force) and the acceleration components of the gravitational force, because the deformation of the tread portion due to contact is small and changes smoothly on the circumference. In contrast, in the first regions, the deformation of the tread portion due to contact is big and changes rapidly. Accordingly, the change in the acceleration components due to contact deformation are greater than the change in the acceleration components of the centrifugal force (centripetal force) due to tire rotation and the acceleration components of the gravitational force. In other words, the measurement data of acceleration in the second regions is generally the acceleration components of the centrifugal force (centripetal force) due to tire rotation and the acceleration components of the gravitational force, and by calculating the first approximation curve mainly using the measurement data of acceleration in the second regions, the acceleration components of the centrifugal force (centripetal force) due to tire rotation and the acceleration components of the gravitational force not only in the second region, but also in the first region can be estimated accurately.

Although in FIG. 3C, the first region is assumed to be the range having an angle of at least 0° and less than 90° in absolute values relative to the contact center positions (θ=180 degree, 540 degree, and 900 degree), in the practice of the present invention, the first region may be at least within a range having an angle of equal to or greater than 0 degree and less than 60 degree in absolute values relative to the contact center positions.

Figure 3D:
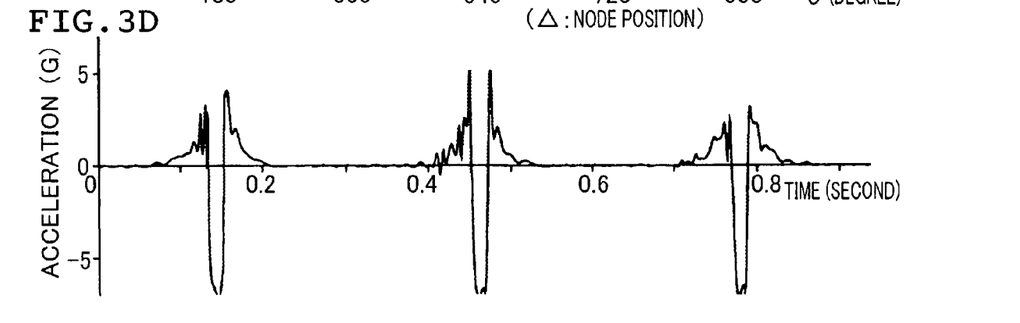

Next, the first approximation curve representing the calculated background component 1 is subtracted from the measurement data of acceleration processed in step S102, so that the acceleration components of the centrifugal force due to tire rotation and the acceleration components of the gravitational force are removed from the measurement data (step S106). FIG. 3D shows the time series data of acceleration after the removal. In this manner, the acceleration components due to contact deformation of the tire tread portion are extracted.

Subsequently, the calculated time series data of acceleration due to contact deformation is then subjected to time integration of second order in the deformation calculating unit 16 to generate displacement data (step S108).

Figure 4A:
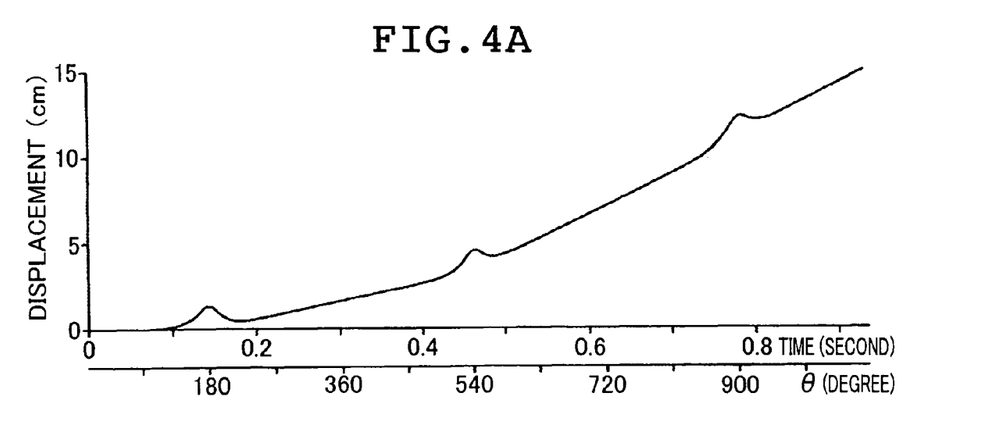
FIGS. 4A to 4C are graphs each showing a signal waveform obtained by the tire deformation calculating method of the present invention.

Since the acceleration data to be subjected to integration generally contains noise components, when integration of second order is carried out, the noise components are also subjected to integration, which prevents generation of accurate displacement data. FIG. 4A shows a result of integration of second order performed on the time series data of acceleration shown in FIG. 3C with respect to time. As shown in FIG. 4A, it is observed that displacement increases with time. This is because, the time series data of acceleration to be subjected to integration contains noise components and those noise components are increasingly accumulated through integration. In general, if deformation or displacement at a given point of the tread portion of a tire that is rotating in a steady manner is observed, cyclical changes are typically demonstrated with a duration corresponding to one round of tire rotation as one cycle. This means, as a general rule, displacement does not increase with time.

Therefore, in order to allow the displacement data obtained through time integration of second order to demonstrate cyclical changes with a duration corresponding to one round of tire rotation as one cycle, the following processes are carried out on the displacement data.

Noise components contained in the displacement data are calculated as the background component 2 in a similar manner as used for calculating the background component 1 in step S104 (step S110).

Figure 4B:
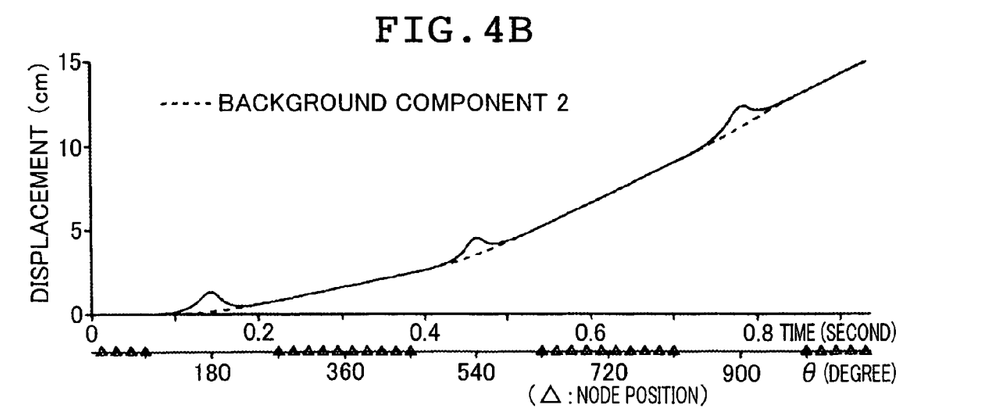

Specifically, a region of the tire circumference is divided into a third region including a contact region in contact with a road surface and a fourth region including other than the third region. The regions which are defined as the third region include a region having a θ of greater than 90 degree and less than 270 degree, a region having a θ of greater than 450 degree and less than 630 degree, and a region having a θ of greater than 810 degree and less than 990 degree. On the other hand, the regions that are defined as the fourth region include a region having a θ of equal to or greater than θ degree and equal to or less than 90 degree, and equal to or greater than 270 degree and equal to or less than 360 degree; a region having a θ of equal to or greater than 360 degree and equal to or less than 450 degree, and equal to or greater than 630 degree and equal to or less than 720 degree; and a region having a θ of equal to or greater than 720 degree and equal to or less than 810 degree, and equal to or greater than 990 degree and equal to or less than 1080 degree. The background component 2 is obtained by using a plurality of positions (θ, or time corresponding to θ) on the circumference in the fourth region as nodes so as to calculate a second approximation curve on the data in the third and fourth regions through least squares method using a set of predetermined functions. The third region may be the same with or different from the above-described first region. Also, the fourth region may be the same with or different from the above-described second region. As described above, the nodes provide constraint conditions on the horizontal axis, that give local curvatures (jog) of the spline functions. FIG. 4B shows the second approximation curve representing the background component 2 with a dotted line. In the example shown in FIG. 4B, the positions as indicated by "Δ" in FIG. 4B, that is, the positions of time where θ is 10 degree, 30 degree, 50 degree, 70 degree, 90 degree, 270 degree, 290 degree, 310 degree, 330 degree, 350 degree, 370 degree, 390 degree, 410 degree, 430 degree, 450 degree, 630 degree, 650 degree, 670 degree, 690 degree, 710 degree, 730 degree, 750 degree, 770 degree, 790 degree, 810 degree, 990 degree, 1010 degree, 1030 degree, 1050 degree, and 1070 degree are defined as the node positions.

By carrying out function approximation on the data shown in FIG. 4A with the third-order spline functions routing through the above described nodes, a second approximation curve as indicated by dotted lines in FIG. 4B is calculated. When carrying out function approximation, there are no nodes in the third regions, and only the plurality of nodes in the fourth regions are used. In least squares method that is carried out in conjunction with the function approximation, the weighting coefficient for the fourth region is set to 1, and the weighting coefficient for the third regions is set to 0.01. The reason why the weighting coefficient for the third regions is smaller than the weighting coefficient for the fourth regions, and no nodes are set in the third regions in calculating the background component 2, is to calculate the background component 2 by using the displacement data mainly in the fourth regions. In the fourth regions, because deformation of the tread portion due to contact is small and such deformation changes smoothly on the circumference, the tire deformation is small on the circumference and such changes are also extremely small. In contrast, in the third regions, the tire tread portion is greatly displaced based on deformation due to contact and changes rapidly. For this reason, the deformation due to contact is great on the circumference and changes rapidly. In other words, the deformation of the tread portion in the fourth region is substantially constant as compared to the deformation in the third region. Accordingly, by calculating the second approximation curve mainly using the displacement data obtained in the fourth regions through integration of second order, the deformation of the rotating tire can be obtained accurately, not only in the fourth regions, but also in the third regions including the contact region.

FIG. 4B shows the second approximation curve calculated mainly using the displacement data in the fourth regions with dotted lines. In the fourth regions, the second approximation curve substantially coincides with the displacement data (solid lines).

Lastly, the approximation curve calculated as the background component 2 is subtracted from the displacement data calculated in step S110, so that the distribution of deformation of the tread portion due to contact deformation is calculated (step S112).

Figure 4C:
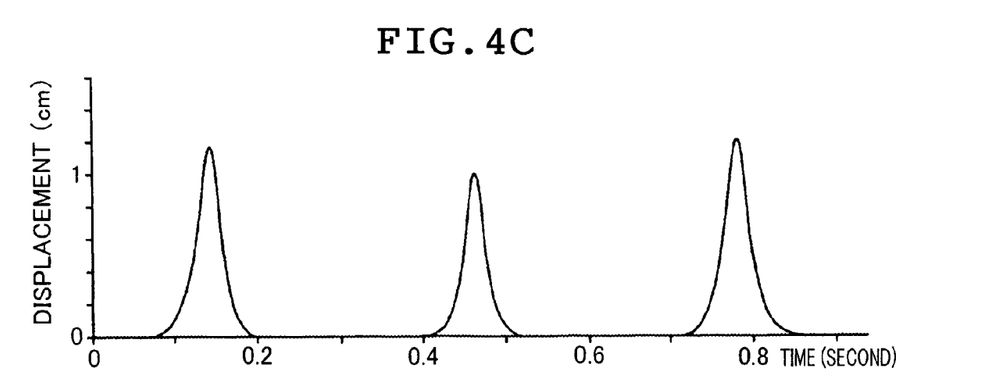

FIG. 4C shows the distribution of deformation of the tread portion due to contact, calculated by subtracting the second approximation curve (dotted line) from the displacement signal (solid line) shown in FIG. 3B. FIG. 4C shows the distribution of deformation when the predetermined measurement positions on the tread portion rotate and displace on the circumference, for a duration corresponding to three rounds of tire rotation (three times of contact). As is observed, the deformation changes each time when the measurement portion of the tire is made to contact due to rotation of the tire.

The deformation thus calculated is summarized in the data output unit 18 as the data for output and outputted to a display 24 or a printer (not shown). The deformation obtained in this manner accurately coincides with the deformation obtained through simulation using finite element models of the tire.

Finally, the time series data of deformation in the tread portion shown in FIG. 4C is subjected to differentiation of second order with respect to time so as to calculate the time series data of acceleration corresponding to the deformation of the tread portion with noise components being eliminated from the acceleration shown in FIG. 3D, that is, the time series data of acceleration due to contact deformation of the tread portion (see subsequently described FIG. 5A) free from noise components (step S114).

In addition, in the data output unit 18, the contact region and the contact length of the rotating tire can be obtained by using the deformation.

Figure 5A:
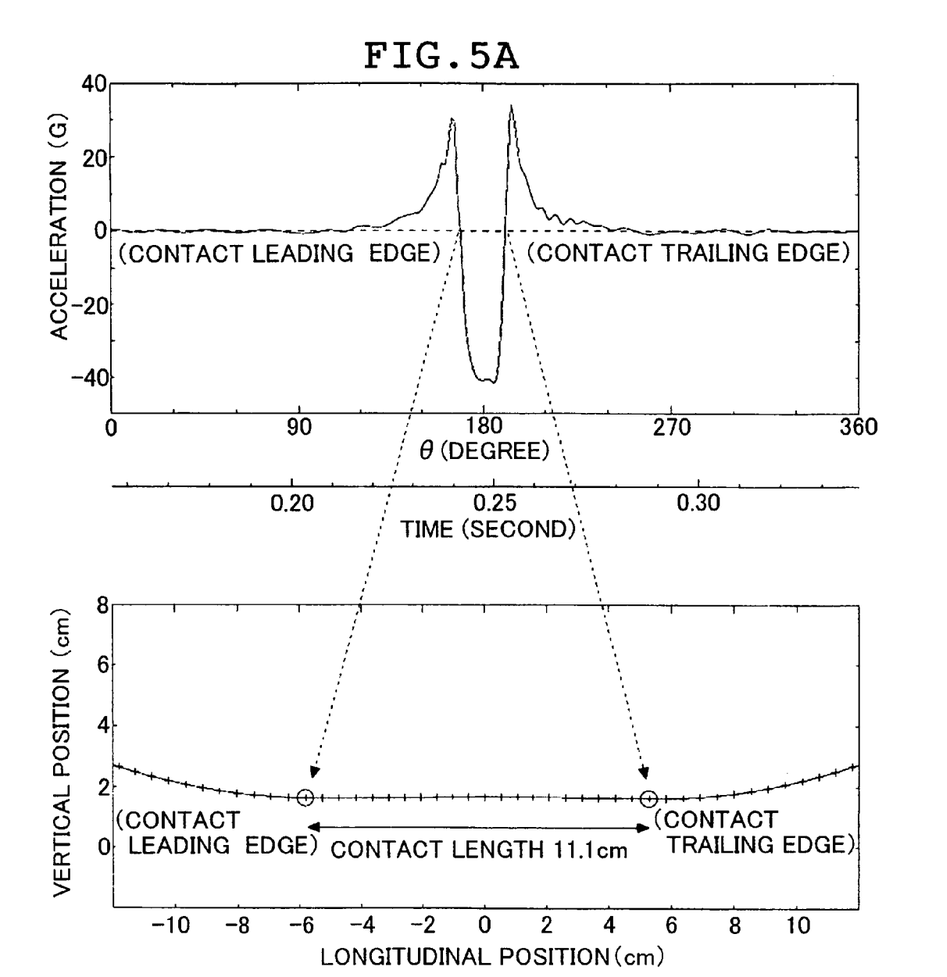
FIGS. 5A and 5B are explanatory charts illustrating a method of calculating a contact length using the tire deformation calculating method of the present invention.

FIG. 5A illustrates a method of calculating a contact region and a contact length.

First, two points are determined in the time series data of acceleration extracted in step S114, at which acceleration crosses 0 with a sharp change. The time series data of acceleration is the data based on the contact deformation of the tire tread portion, and does not contain noise components.

Next, positions in the displacement data that are corresponding to the two points as obtained above are determined, so that such positions are defined as positions of a contact leading edge and a contact trailing edge, as shown in FIG. 5A. The reason why the portions at which the time series data of acceleration changes sharply can be determined as the contact leading edge and the contact trailing edge, is that the tire is deformed rapidly each time when the tread portion rotates to enter the contact region or exit the contact region. Further, it is possible to clearly determine the positions at which the time series data of acceleration crosses 0.

The lower graph in FIG. 5A shows the deformation shape of the tire deformed due to contact. The graphs are shown by converting a polar coordinate system that is represented by the radial direction and the circumferential direction of the tire into an orthogonal coordinate system that is represented by the vertical direction and the longitudinal direction of the tire. By determining the positions of the contact leading edge and the contact trailing edge on the graph, the contact length can be evaluated.

The contact length calculated in this manner, accurately coincides with the contact length obtained through simulation using finite element models of the tire.

Figure 5B:
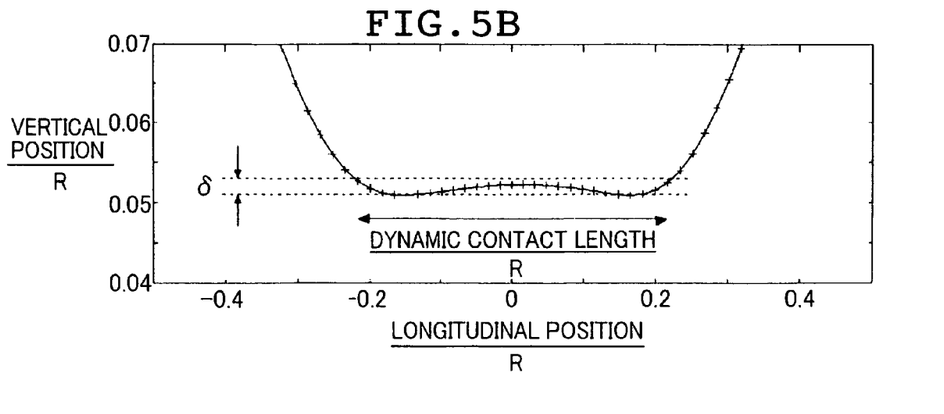

Further, instead of using the method shown in FIG. 5A, a method shown in FIG. 5B may be used to obtain the contact region and the contact length.

Specifically, FIG. 5B is a graph showing the deformation shape of the tire. The horizontal axis is given through normalization of the positions in longitudinal direction of the tire by dividing the position by an outer diameter R of the tire tread portion, and the vertical axis is given through normalization of the position in the vertical direction of the tire by dividing the positions by the outer diameter R, while the position of the center of the tire contact is defined as the origin. As shown in FIG. 5B, the positions at which the tire deformation shape crosses a liner line that is a predetermined distance δ upwardly away from the lowest point in the vertical direction are defined as the normalized position corresponding to the contact leading edge and the normalized positions corresponding to the contact trailing edge respectively. The normalized positions are obtained respectively and then multiplied by the outer diameter R to obtain the positions of the contact leading edge and the contact trailing edge, thus allowing the contact region and the contact length of the tire to be obtained. The predetermined distance δ used in defining the leading edge position and the trailing edge position is, for example, preferably within a range of 0.001 to 0.005.

Alternatively, the positions at which a square value of the distance of the tread portion upward away from the lowest point crosses a predetermined value may be assumed as the contact leading edge and the contact trailing edge. In this case, the predetermined value is, for example, within a range of $0.00002(cm^2)$ to $0.00005(cm^2)$, and preferably, $0.00004$ $(cm^2)$. A significantly high correlation has been observed between the measurement result obtained through an extensive examination of the contact length using various loads applied to a stationary tire and the result of the contact length obtained in the above described method.

Figure 6:
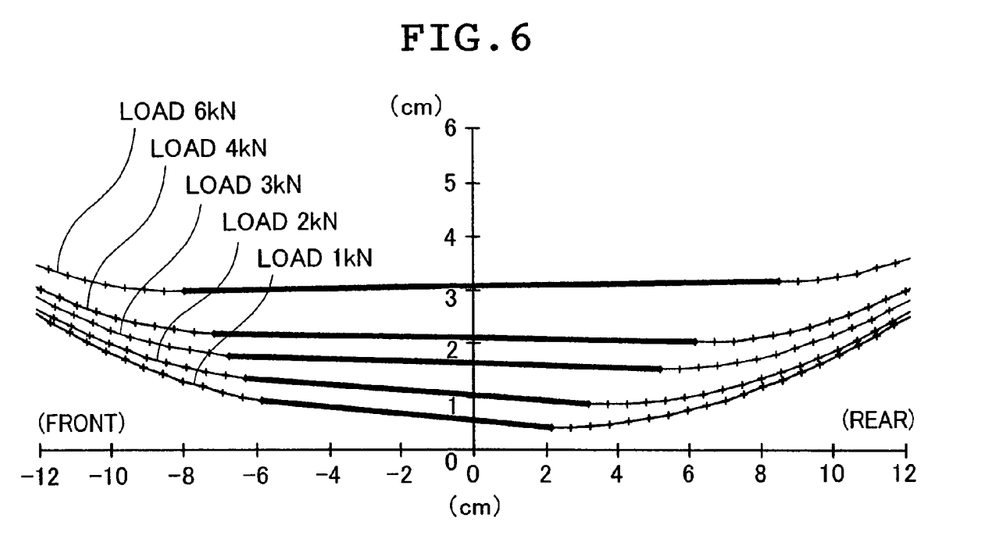
FIG. 6 shows an example of a contact length calculated by the tire deformation calculating method of the present invention.

FIG. 6 shows examples of contact region and contact length obtained by the above described method. In FIG. 6, thicker lines highlight the contact region.

All of the above examples calculate the deformation in the tire radial direction by using the measurement data of acceleration in the radial direction at the tire tread portion. However, in the practice of the present invention, it is also possible to acquire the measurement data of acceleration in the circumferential direction or in the width direction (parallel with the rotation axis of the tire) at the same time to calculate the deformation in the tire circumferential direction or width direction using the method shown in FIG. 2. In summary, the tire deformation calculating method of the present invention enables calculation of the tire deformation by using at least one of the measurement data of acceleration in the radial direction perpendicular to the tire circumferential direction, the measurement data of acceleration in the tire circumferential direction, and the measurement data of acceleration in the tire width direction.

In addition, if the measurement data of acceleration includes the acceleration data in tire circumferential direction, in addition to the acceleration data in the radial direction perpendicular to the tire circumferential direction, the deformation in the radial direction and in the circumferential direction of the tire tread portion can be obtained as the tire deformation. At the same time, the deformation thus obtained can be used to accurately calculate the contact length of the tire during rotation.

Figure 7A:
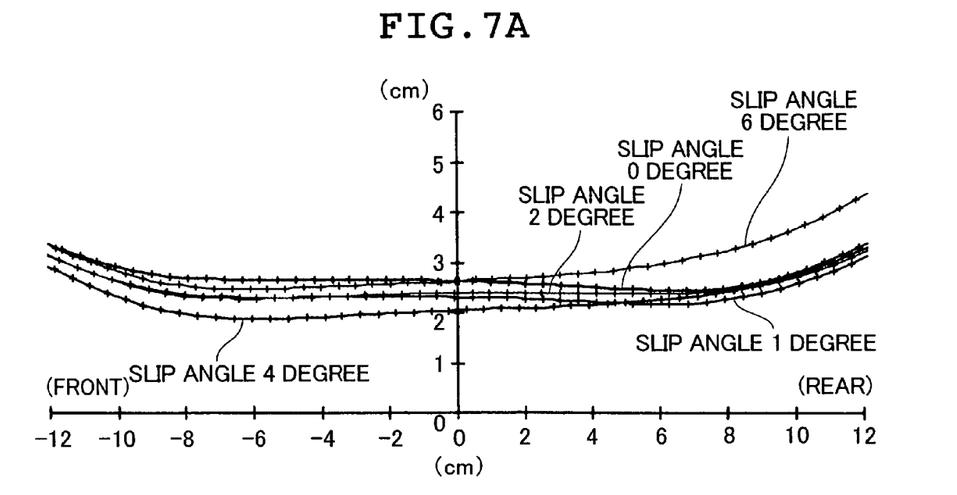
FIGS. 7A and 7B show tire deformation shapes obtained by the tire deformation calculating method of the present invention.
Figure 7B:
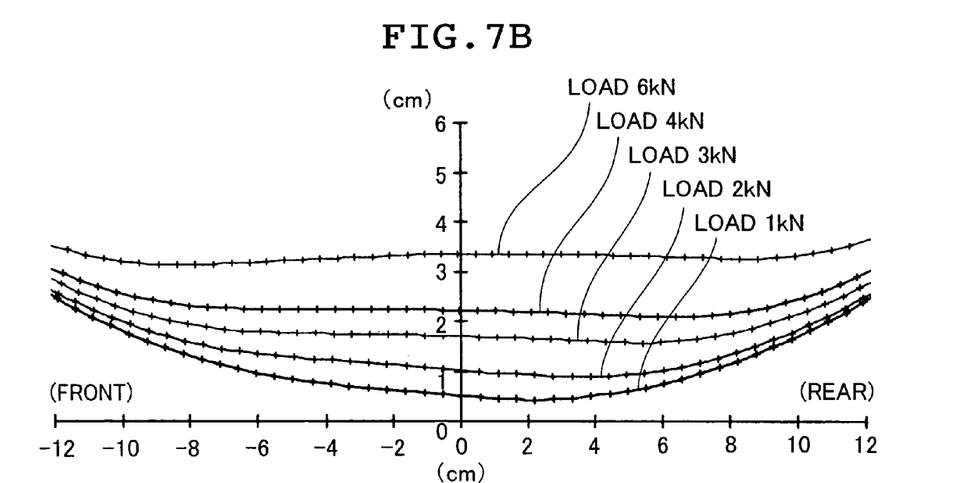

FIGS. 7A and 7B are examples of graphs showing the locus of deformation of the inner circumference surface at the tread portion acquired using the tire deformation calculating method of the present invention. The tire deformation calculated using the acceleration in the radial direction and the acceleration in the tire circumferential direction is shown. The acceleration is measured by an acceleration sensor attached to the center portion of the inner circumference of the tread portion.

The example shown in FIG. 7A is acquired with a tire size of 205/70R15 95H, a rotation speed of 60 (km/hour), an inflation pressure of 200 (kPa), and a load of 4 (kN). The example shown in FIG. 7B is acquired with a tire size of 205/70R15 95H, a rotation speed of 40 (km/hour), a pneumatic pressure of 200 (kPa), and a slip angle of 0. From FIG. 7A, and FIG. 7B, it is observed that changes in the slip angle, or changes in the load can cause changes in the deformation shape.

Figure 8A:
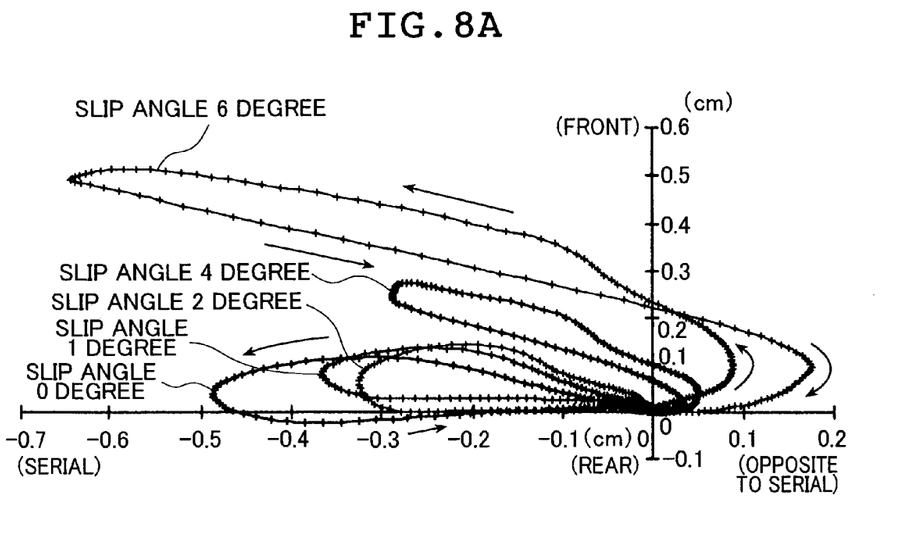
FIGS. 8A and 8B show deformation in the circumferential direction and in the width direction of the tire obtained by the tire deformation calculating method of the present invention.
Figure 8B:
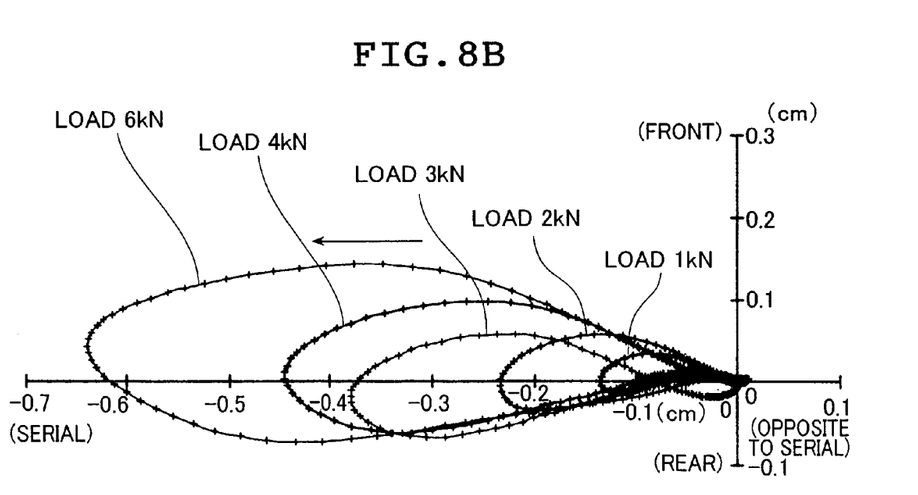

FIGS. 8A and 8B are examples of graphs showing the locus of deformation of the inner circumference surface at the tread portion acquired using the tire deformation calculating method of the present invention. Shown in the graphs are the tire deformation in the tire circumferential direction and the tire deformation in the width direction calculated using the acceleration in the circumferential direction and the acceleration in the width direction.

The example shown in FIG. 8A, is acquired with a tire size of 205/70R15 95H, a rotation speed of 60 (km/h), an inflation pressure of 200 (kPa), and a load of 4 (kN). The example shown in FIG. 8B is acquired with a tire size of 205/70R15 95H, a rotation speed of 40 (km/h), an inflation pressure of 200 (kPa), and a slip angle of 0. In FIG. 8A, it is observed that provision of slip angles causes tire deformation in the serial side (left side in FIG. 8A). It is also observed in FIG. 8B, with an increase in the load, the deformation is increased in the tire circumferential direction and in the width direction, causing the tire tread portion to be deformed in the serial side of the tire width direction.

As described, the deformation of the tire tread portion can be calculated in any direction of the radial direction, the circumferential direction and the width direction, so that the deformation shape or locus of the rotating tire can be obtained. In addition, in the practice of the present invention, by arranging a plurality of acceleration sensors on the inner circumference surface of the tire circumference at the tread portion, a plurality of measurement points on the circumference at the tread portion are measured at the same time. Further, a plurality of acceleration sensors may be provided in the tire width direction to obtain the distribution of the contact length or the contact region in the width direction, so that the contact region contour of the rotating tire can be obtained.

The measurement data of acceleration used in the present invention, may be acquired through the acceleration sensor attached to the inner circumference surface of the tread portion, or through an acceleration sensor embedded inside the tire.

INDUSTRIAL APPLICABILITY

As described heretofore, the present invention enables calculation of deformation of a tire which is rotating on a road surface by using measurement data of acceleration at a predetermine portion of the tire, for example, at a tread portion. Accordingly, information having significant effect on the tire performance, such as the contact length and the contact region contour of the tire during rotation, and, in addition, the tire deformation in the contact region, can be obtained.

The invention claimed is:

1. A tire deformation calculating method for calculating a deformation of a tire which is rotating on a road surface, the method comprising;
    an acquiring step for acquiring measurement data of acceleration of the rotating tire for a duration corresponding to at least one round of tire rotation, the measurement data of acceleration acquired by an acceleration sensor that is attached to a predetermined portion of the tire;
    a signal processing step for deriving time series data of acceleration due to tire deformation from the acquired measurement data of acceleration, by removing a background component of the acquired measurement data of acceleration; and
    a deformation calculating step for subjecting the time series data of acceleration due to tire deformation to a time integration of second order so as to obtain displacement data, to thereby calculate the deformation at the predetermined portion of the tire.

2. The tire deformation calculating method according to claim 1, wherein the predetermined portion is a tread portion of the tire,
    wherein in the acquiring step, the acceleration of the tread portion of the tire is acquired, and
    wherein in the deformation calculating step, the deformation of the tread portion of the tire is calculated.

3. The tire deformation calculating method according to claim 2, wherein:
    a circumference region of the tread portion of the tire is divided into a first region including a contact region in contact with the road surface, and a second region including other than the first region;
    in the signal processing step, a first approximation curve represented on the first and second regions is calculated by approximating the measurement data of acceleration in the second region, and time series data of acceleration due to tire deformation in the first and second regions is derived by subtracting the first approximation curve from a waveform of the acceleration acquired in the acquiring step.

4. The tire deformation calculating method according to claim 3, wherein the first approximation curve is obtained by approximating the measurement data of acceleration in the first region in addition to the second region with a plurality of nodes provided in the second region.

5. The tire deformation calculating method according to claim 3, wherein the first approximation curve is calculated by approximating the time series data of acceleration in the first and second region, with weighting coefficients applied to the time series data of acceleration in the first region and to the time series data of acceleration in the second region,
wherein weighting coefficients applied to the time series data of acceleration in the second region are greater than weighting coefficients applied to the time series data of acceleration in the first region.

6. The tire deformation calculating method according to claim 3, wherein the second region has an angle in a circumferential direction of at least 60 degree in absolute values, the angle defined relative to a center position of the contact region of the tire.

7. The tire deformation calculating method according to claim 3, wherein a circumference region of the tread portion of the tire is divided into a third region including a contact region in contact with the road surface, and a fourth region including other than the third region, and in the deformation calculating step, a second approximation curve represented on the first and second regions is calculated by approximating the displacement data in the fourth region, and the deformation of the tire is calculated by subtracting the second approximation curve from a waveform of the displacement data.

8. The tire deformation calculating method according to claim 7, wherein the second approximation curve is obtained by approximating the displacement data in the third region in addition to the fourth region with a plurality of nodes provided in the fourth region.

9. The tire deformation calculating method according to claim 7, wherein the second approximation curve is calculated by approximating the displacement data in third and fourth regions by using a least squares method with weighting coefficients applied to the displacement data in the third region and to the displacement data in the fourth region,
wherein weighting coefficients applied to the displacement data in the fourth region are greater than weighting coefficients applied to the displacement data in the third region.

10. The tire deformation calculating method according to claim 1, wherein the measurement data of acceleration is at last one of acceleration data in a radial direction perpendicular to a circumferential direction of the tire, acceleration data in the circumferential direction of the tire, and acceleration data in a width direction of the tire.

11. The tire deformation calculating method according to claim 1, wherein the measurement data of acceleration includes acceleration data in a radial direction perpendicular to a circumferential direction of the tire, or includes, in addition to acceleration data in the radial direction, acceleration data in the circumferential direction of the tire, and
wherein in the signal processing step, an acceleration component of a centrifugal force of the tire while rotating, and an acceleration component of a gravitational force of the tire while rotating are removed as the background component of the acquired measurement data of acceleration.

12. The tire deformation calculating method according to claim 1, wherein the measurement data of acceleration includes the acceleration data in a radial direction perpendicular to a circumferential direction of the tire, or includes, in addition to the acceleration data in the radial direction, the acceleration data in the circumferential direction of the tire; and the deformation of the tire is the deformation at the tread portion of the tire in the radial and circumferential directions, or the deformation in the radial direction; and from the deformation, the contact length of the tire during rotation is calculated.

13. The tire deformation calculating method according to claim 12, wherein if the measurement data of acceleration is the acceleration data in the radial direction perpendicular to the circumferential direction of the tire, the contact length is calculated by determining two positions at which the time series data of acceleration due to tire deformation crosses an acceleration of 0, and by using the two positions as positions corresponding to a leading edge and a trailing edge of the contact region of the tire.

14. The tire deformation calculating method according to claim 13, wherein the time series data of acceleration due to tire deformation to be used for calculating the contact length is obtained by subjecting the deformation calculated in the deformation calculating step to a differentiation of second order with respect to time.

15. The tire deformation calculating method according to claim 12, wherein the contact length is calculated by obtaining a deformation shape of the tire from the displacement data obtained in the deformation calculating step and by assuming positions at which the deformation shape crosses a line which is a predetermined distance away from a lowest point of the tire toward upward direction of the tire as a leading edge and a trailing edge of the contact region of the tire.

16. A tire deformation calculating apparatus for calculating a deformation of a tire which is rotating on a road surface, the apparatus comprising:
an acquiring unit for acquiring measurement data of acceleration of the rotating tire for a duration corresponding to at least one round of tire rotation, the measurement data of acceleration acquired by an acceleration sensor that is attached to a predetermined portion of the tire;
a signal processing unit for deriving time series data of acceleration due to tire deformation from the acquired measurement data of acceleration, by removing a background component of the acquired measurement data of acceleration; and
a deformation calculating unit for subjecting the time series data of acceleration due to tire deformation to a time integration of second order so as to obtain displacement data, to thereby calculate the deformation at the predetermined portion of the tire.

* * * * *